United States Patent
Drew et al.

(10) Patent No.: US 10,184,520 B2
(45) Date of Patent: Jan. 22, 2019

(54) SELF-LUBRICATED BEARING COMPOSITIONS AND METHODS OF MAKING THE SAME

(71) Applicant: NEW HAMPSHIRE BALL BEARINGS, INC., Peterborough, NH (US)

(72) Inventors: Grant A. Drew, Sanbornton, NH (US); Richard R. Soelch, Sanbornton, NH (US)

(73) Assignee: NEW HAMPSHIRE BALL BEARING, INC., Peterborough, NH (US)

( * ) Notice: Subject to any disclaimer, the term of this patent is extended or adjusted under 35 U.S.C. 154(b) by 276 days.

(21) Appl. No.: 15/233,309

(22) Filed: Aug. 10, 2016

(65) Prior Publication Data
US 2016/0348720 A1 Dec. 1, 2016

Related U.S. Application Data

(62) Division of application No. 13/287,251, filed on Nov. 2, 2011.
(Continued)

(51) Int. Cl.
F16C 33/10 (2006.01)
F16C 23/04 (2006.01)
F16C 33/20 (2006.01)

(52) U.S. Cl.
CPC .......... *F16C 33/104* (2013.01); *F16C 23/045* (2013.01); *F16C 33/103* (2013.01);
(Continued)

(58) Field of Classification Search
CPC ......... Y10T 29/49643; Y10T 29/49648; Y10T 29/49702; F16C 33/201; F16C 23/045
(Continued)

(56) References Cited

U.S. PATENT DOCUMENTS 2,675,276 A 4/1954 Daugherty
2,815,821 A 12/1957 Echeverria
(Continued)

FOREIGN PATENT DOCUMENTS

EP 1775488 4/2007
EP 1775488 A1 * 4/2007 ............... C08J 9/26
JP 6229426 8/1994

OTHER PUBLICATIONS

Office Action from related European Appln. No. 11794916.4 dated Feb. 25, 2015.
(Continued)

*Primary Examiner* — Jason L Vaughan
*Assistant Examiner* — Amanda J Meneghini
(74) *Attorney, Agent, or Firm* — Grossman, Tucker, Perreault & Pfleger, PLLC

(57) ABSTRACT

A self-lubricated bearing contains a first member, a second member configured to slide against the first member, and a lubricating liner disposed in a sliding contact area between the first member and the second member. The lubricating liner contains at least one structural polymer and at least one lubricant with viscosity less than 5100 centistokes. A method is also provided for making the bearings, which includes adding the at least one lubricant with viscosity less than about 5100 centistokes to one or more components of the lubricating liner during the process of making the liner or bearing. The self-lubricated bearing compositions of the invention have surprisingly long service lives versus prior art self-lubricated bearings.

24 Claims, 8 Drawing Sheets

Related U.S. Application Data

(60) Provisional application No. 61/419,864, filed on Dec. 5, 2010.

(52) U.S. Cl.
CPC ........ *F16C 33/201* (2013.01); *F16C 2208/02* (2013.01); *F16C 2208/30* (2013.01); *F16C 2240/00* (2013.01); *F16C 2326/43* (2013.01); *Y10T 29/49636* (2015.01)

(58) Field of Classification Search
USPC .................................................. 384/206, 213
See application file for complete search history.

(56) References Cited

U.S. PATENT DOCUMENTS

| | | | |
|---|---|---|---|
| 3,929,396 A | 12/1975 | Orkin | |
| 3,974,988 A | 8/1976 | Whitworth et al. | |
| 3,996,143 A | 12/1976 | Nagy et al. | |
| 4,053,665 A | 10/1977 | Nagy | |
| 4,060,287 A | 11/1977 | Orkin | |
| 4,134,842 A | 1/1979 | Nagy | |
| 4,199,199 A | 4/1980 | Granda | |
| 4,327,474 A | 5/1982 | Holden | |
| 4,842,424 A | 6/1989 | Narkon et al. | |
| 5,085,520 A | 2/1992 | Fujan | |
| 5,110,221 A | 5/1992 | Narkon et al. | |
| 5,265,965 A * | 11/1993 | Harris | F16C 23/045 384/192 |
| 5,288,354 A | 2/1994 | Bozych | |
| 5,431,500 A | 7/1995 | Bozych | |
| 5,470,414 A | 11/1995 | Bozych | |
| 5,494,357 A | 2/1996 | Bozych | |
| 5,560,103 A | 10/1996 | Bozych | |
| 5,707,718 A | 1/1998 | Matsukawa et al. | |
| 5,731,373 A * | 3/1998 | Hirose | C08K 5/0008 524/425 |
| 5,762,424 A | 6/1998 | Bozych | |
| 5,767,218 A | 6/1998 | Becker | |
| 6,180,574 B1 | 1/2001 | Ryan | |
| 6,377,770 B1 | 4/2002 | Hirose et al. | |
| 6,432,887 B1 | 8/2002 | Yamamoto et al. | |
| 6,548,188 B1 | 4/2003 | Yanase | |
| 6,548,454 B1 | 4/2003 | Yamamoto et al. | |
| 6,688,767 B2 * | 2/2004 | Schellhase | B64C 27/39 384/222 |
| 6,710,593 B2 | 3/2004 | Babin | |
| 6,729,763 B2 | 5/2004 | Post et al. | |
| 7,147,378 B2 | 12/2006 | Chu | |
| 7,264,398 B2 | 9/2007 | Davies et al. | |
| 7,278,788 B2 | 10/2007 | Fish | |
| 7,604,412 B2 | 10/2009 | Smith | |
| 2003/0095729 A1 | 5/2003 | Krakowski et al. | |
| 2004/0008914 A1 | 1/2004 | Hiramatsu et al. | |
| 2005/0166695 A1 * | 8/2005 | Yabe | F16C 19/20 74/424.88 |
| 2005/0175266 A1 | 8/2005 | Broding et al. | |
| 2006/0062502 A1 | 3/2006 | Hupp | |
| 2007/0009189 A1 | 1/2007 | Smith | |
| 2007/0123652 A1 | 5/2007 | Chu et al. | |
| 2007/0232502 A1 | 10/2007 | Hideyuki et al. | |
| 2007/0297704 A1 * | 12/2007 | Mayston | F16C 33/201 384/276 |
| 2009/0100949 A1 * | 4/2009 | Shirai | F16C 29/005 74/89.14 |
| 2009/0105105 A1 | 4/2009 | Hashida et al. | |
| 2009/0232432 A1 | 9/2009 | Egami et al. | |
| 2009/0245702 A1 | 10/2009 | Kagohara et al. | |
| 2009/0257694 A1 | 10/2009 | Dimartino | |
| 2010/0105584 A1 | 4/2010 | Avataneo et al. | |
| 2010/0305012 A1 | 12/2010 | Miyamoto et al. | |

OTHER PUBLICATIONS

Office Action from related European Appln. No. 11794916.4 dated Mar. 24, 2016.
Intention to Grant from related European Appln. No. 11794916.4 dated Feb. 1, 2017.
Fowzy, Mahmoud A., PFPE, A Unique Lubricant for a Unique Application, Jun. 24, 1998 www.dtic.mi/cgi-bin/GetTrDoc?AD=ADA347666.
Amsoil, Lubricant Cross Reference Guide, Copyright 2002. www.bamacinc.com/amsoilpdfs/Industrial%20Lubricants%20Cross%20Reference%20Guide.pdf.
GGB Bearing Technologyu, Product Range, Copyright 2007, ggbearings.com/pdf/literature/productrange/PR_English.pdf.
Viscosity Classifications, Industrial Lubricant Classifications. Opie Oils.co.uk, 2008. opieoils.co.uk/pdfs/viscosities.pdf.
International Search Report and Written Opinion from related PCT Appln. No. PCT/US2011/063274 dated Feb. 22, 2012.

* cited by examiner

SELF-LUBRICATED BEARING COMPOSITIONS AND METHODS OF MAKING THE SAME

CROSS REFERENCE TO RELATED APPLICATIONS

This application is a divisional application of U.S. application Ser. No. 13/287,251 filed on Nov. 2, 2011, which claims priority to U.S. Provisional Application No. 61/419,864 filed on Dec. 5, 2010, the entirety of which are fully incorporated herein by reference.

FIELD OF THE INVENTION

The present invention relates to bearings, and particularly, to bearings having lubricating liners.

BACKGROUND OF THE INVENTION

Prior art bearings have attempted to provide an environment with decreased friction. Unfortunately, such attempts have failed in that they have a shortened service life, thereby having excess maintenance requirements and short bearing reliability. U.S. Pat. No. 3,932,008, by McCloskey and Williams, describes a spherical bearing including a bearing liner having a low friction layer containing a resin matrix which includes therein a dispersion of self-lubricating particles including powdered or flock polytetrafluoroethylene (PTFE) particles and graphite fibers.

Self-lubricated bearings using PTFE as a sliding surface have been in use in the aerospace industry since the 1960's according to U.S. Pat. No. 4,666,318, assigned to Ampep, pic. Thin films of woven PTFE bearing surfaces are frequently reinforced with sintered bronze and textile yarns such as glass, graphite fibers, or high strength organic yarns of relatively high melting point. Woven structures are usually infused with resin systems such as phenol formaldehyde, epoxies or cyanoacrylates to bind the sliding surface into a dense structure. The inventors go on to teach improved bearings using a reinforced low-friction plastic element containing PTFE having a sliding surface and a counter face with a low surface roughness and high hardness.

U.S. Pat. No. 6,180,574 assigned to Rexnord Corporation describes a self-lubricating liner for bearings which includes a curable acrylate composition and a solid lubricant such as PTFE.

The abovementioned bearings, and other prior art bearings, have limited life. The prior art teaches bearings with self-lubricating liners containing fluoropolymer solid lubricants. New self-lubricated bearings are needed with improved service life to reduce maintenance requirements and cost as well as to increase the long term bearing reliability.

SUMMARY OF THE INVENTION

The present invention provides improved self-lubricated bearing compositions containing a first member, a second member configured to slide against the first member, and a lubricating liner disposed in the sliding contact area between the first member and the second member, wherein the lubricating liner contains at least one structural polymer and at least one lubricant with a viscosity less than 5100 centistokes.

The bearing liner can be any bearing liner, including but not limited to, composite liners formed from combinations of: woven and non-woven fabrics; binder resins; solid lubricants such as, but not limited to, polytetrafluoroethylene; and other additives. The bearing liner can also be a coated or molded liner made with: thermoplastic or thermoset resins; solid lubricants such as, but not limited to polytetrafluoroethylene; and other additives, reinforcements, stabilizers, catalysts, thixotropic agents, and colorants.

The present invention provides a way to substantially improve the performance of the prior art self-lubricated bearings by addition of a lubricant having a viscosity less than 5100 centistokes in an amount of from 0.1% to 10% by weight of the total liner. A method is also provided for making the bearings, where the method includes adding the at least one lubricant with viscosity less than 5100 centistokes to one or more components of the lubricating liner during the process of making the liner composition or bearing. A preferred method is provided whereby the at least one lubricant with viscosity below 5100 centistokes is vacuum impregnated into the self-lubricating liner after the liner is adhered to one of the bearing members. The self-lubricated bearings of the invention have surprisingly long service lives versus prior art self-lubricated bearings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides improved self-lubricated bearings containing a first member, a second member configured to slide against the first member, and a lubricating liner disposed in a sliding contact area between the first member and the second member.

The self-lubricating liner contains at least one structural polymer and at least one lubricant with a viscosity less than 5100 centistokes. In a preferred bearing of the invention the at least one lubricant with a viscosity less than 5100 centistokes contains a fluorinated polymer.

A method is also provided for making the bearings, where the method includes adding the at least one lubricant with viscosity less than 5100 centistokes to one or more components of the lubricating liner during the process of making the liner or bearing. A preferred method is provided whereby the at least one lubricant with viscosity below 5100 centistokes is vacuum impregnated into the self-lubricating liner after the liner is adhered to one of the bearing members. The self-lubricated bearings of the invention have surprisingly long service lives versus prior art self-lubricated bearings.

Figure 1:
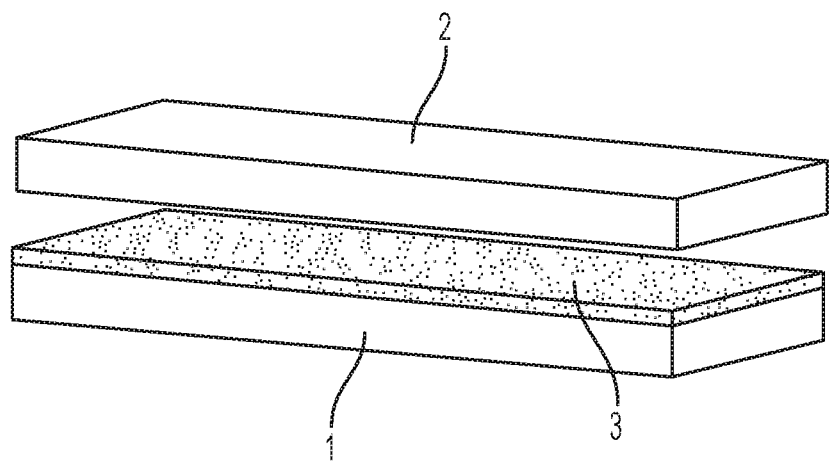
FIG. 1 is an illustration of a bearing composition of the invention, wherein sliding members and a lubricating liner are depicted as flat surfaces.

The self-lubricated bearing is shown in FIG. 1. The illustration provided by FIG. 1 is meant to show the key elements of the invention and is by no means meant to limit the invention. The bearing contains a first member 1 (also referred to herein as a sliding member) configured to slide against a second member 2 (also referred to herein as a second sliding member) where a lubricating liner 3 is attached to first member 1 and located between the first member 1 and the second member 2. The illustration of FIG. 1 shows a space between the three components in order to illustrate that the lubricating liner 3 is attached to the first sliding member 1. In the bearing of FIG. 1, the second sliding member 2 is also in contact with the lubricating liner 3. The lubricating liner 3 moves with the first sliding member 1, to which it is attached, while the second sliding member 2 slides along the surface of the lubricating liner 3. The lubricating liner 3 may be attached to either one or the other sliding member 1, 2 however the lubricating liner 3 can also be floating freely between the members 1, 2 as long as other provisions are made to keep the lubricating liner 3 from moving out of the sliding contact area between the sliding members 1, 2. FIG. 1 depicts the sliding members 1, 2 as flat surfaces. It should be noted, however, that the sliding members 1, 2 can be any shape as long as they are in sliding contact with each other, via the lubricating liner 3.

Figure 2:
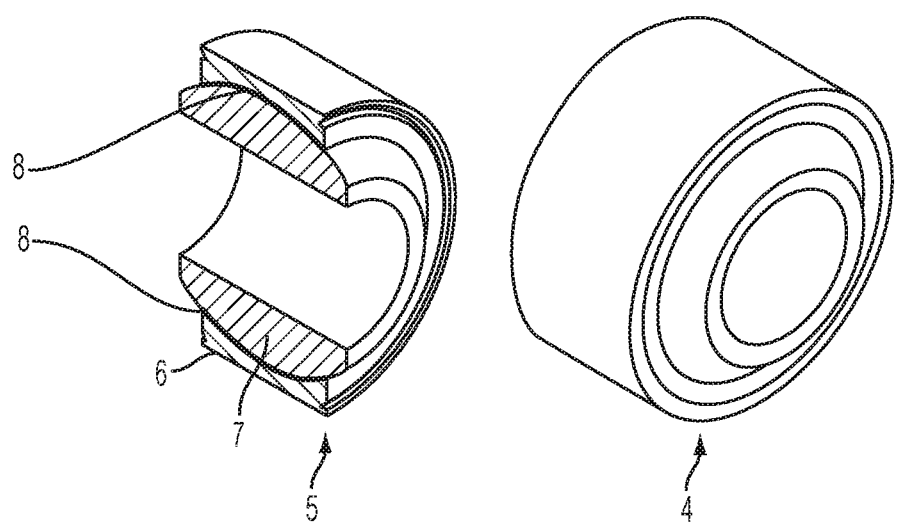
FIG. 2 is a non-limiting illustration of a rotating bearing of the invention, specifically depicted is a self-aligning spherical bearing.

FIG. 2 provides an illustration of one common type of self-lubricated bearing of the invention, specifically, a rotating bearing, 4. It should be noted that the bearing of FIG. 2 is intended to convey one type of object of the invention. These types of bearings can be found in many systems and actuators. A cross sectional view 5 of the rotating bearing 4 is also shown by FIG. 2. A ball 7 of the bearing has a convex outer surface (1st sliding member) in sliding contact with a self-lubricating liner 8, which is attached to a race component 6 (2nd sliding member). The particular ball type shown by FIG. 2 has a central bore so that it can be placed onto a shaft or rod and used in some construction. The self-lubricating liner 8 could also be attached to the ball 7; however this is usually not done in practice as a matter of convenience.

Figure 3:
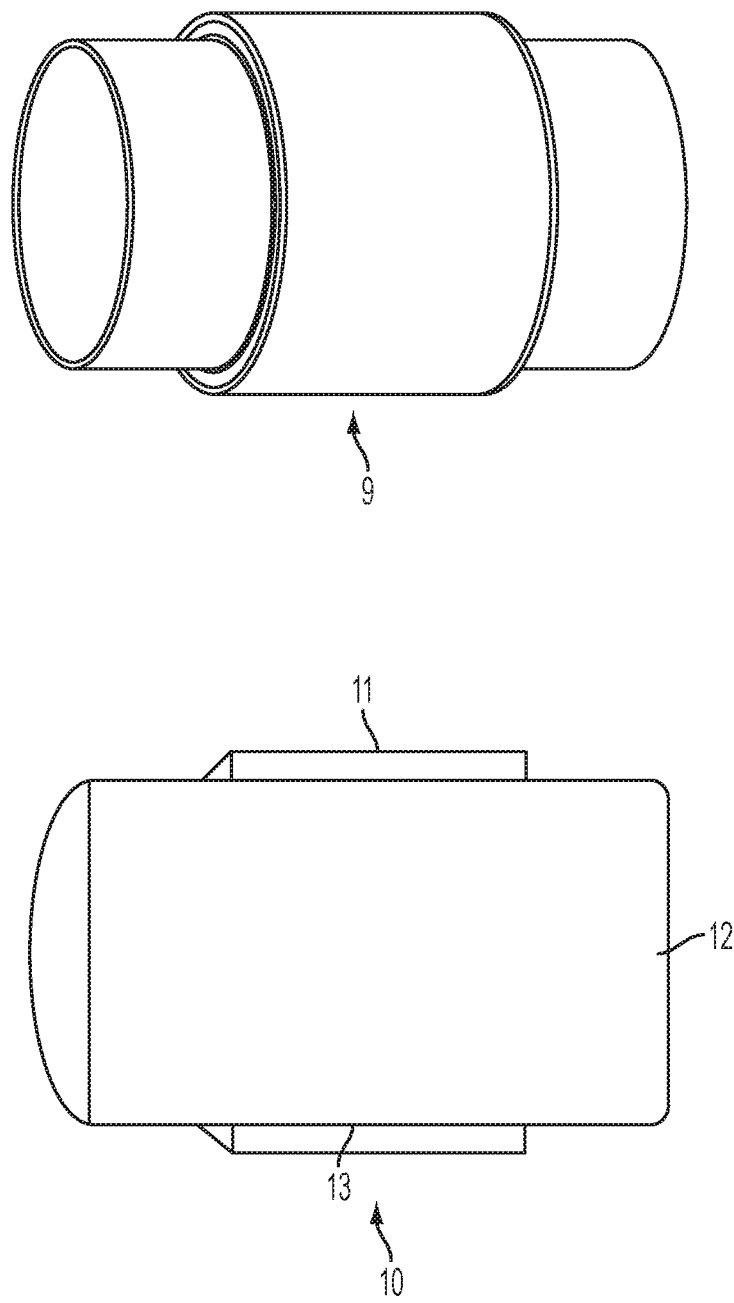
FIG. 3 is a non-limiting illustration of an additional type of bearing of the invention, specifically, a rod in a bushing.

FIG. 3 is an illustration of a rod 12 in a bushing 11, which is another non-limiting example of a type of self-lubricated bearing 9 provided in accordance with the present invention. A cross sectional view 10 of the rod 12 in the bushing 11 is also shown in FIG. 3. The rod 12 is in sliding contact with a self-lubricating liner 13 (the very thin dark area between 11 and 12) disposed between the bushing 11 and the rod 12. The self-lubricating liner 13 is adhered to the bushing 11. The self-lubricating liner 13 contains a structural polymer and at least one lubricant with viscosity below 5100 centistokes.

Figure 4:
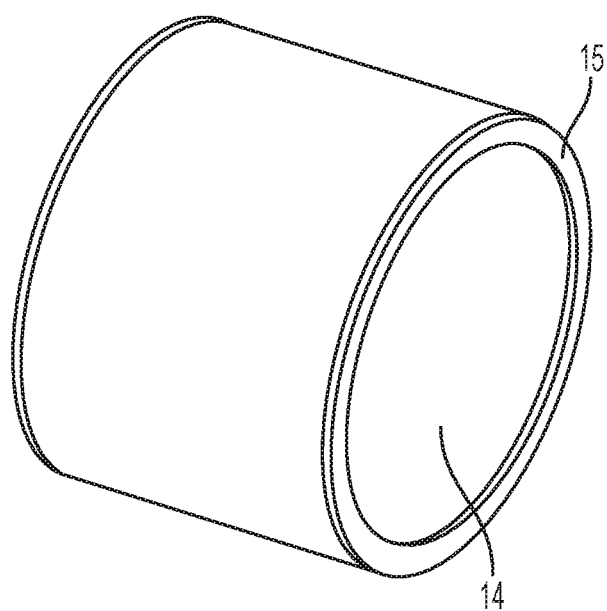
FIG. 4 further illustrates the bushing with self-lubricating liner of FIG. 3.

FIG. 4 illustrates a bushing or one sliding member 15 having the thin liner 14 attached to the inner surface of the sliding member 15. The other sliding surface is not shown in this rendering. The liner 14 is attached to the inner surface of the bushing 15, but could also be attached to the outer surface of the bushing 15 in the case where the other sliding component was a sleeve.

Figure 5:
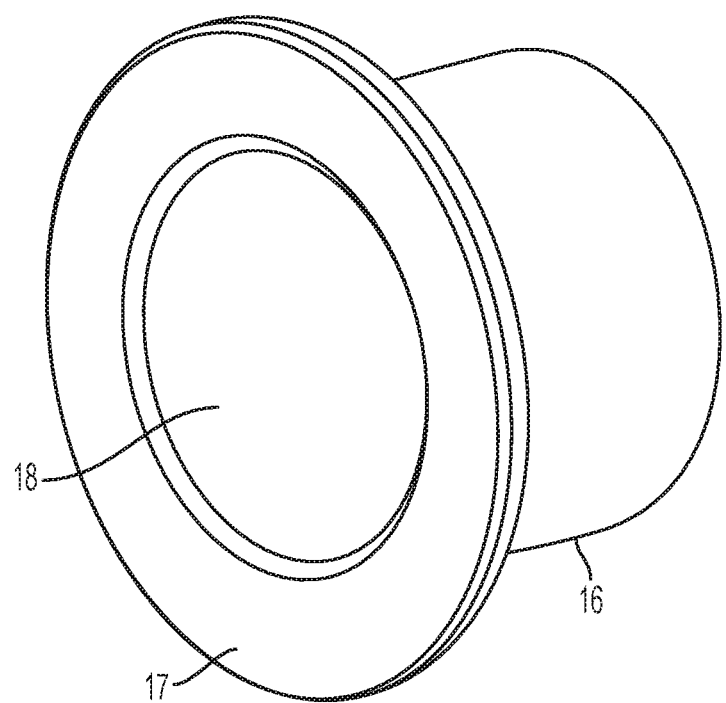
FIG. 5 illustrates a flanged bushing with lubricating liners on two surfaces. This bushing is a component with two bearing component surfaces-the outside flange and the internal circular bushing surface.

FIG. 5 illustrates a flanged bushing 16 with lubricating liners 17, 18 on two surfaces. This bushing is a component with two bearing component surfaces—the outside flange and the internal circular bushing surface. The mating sliding surfaces are not shown in this figure.

Figure 6:
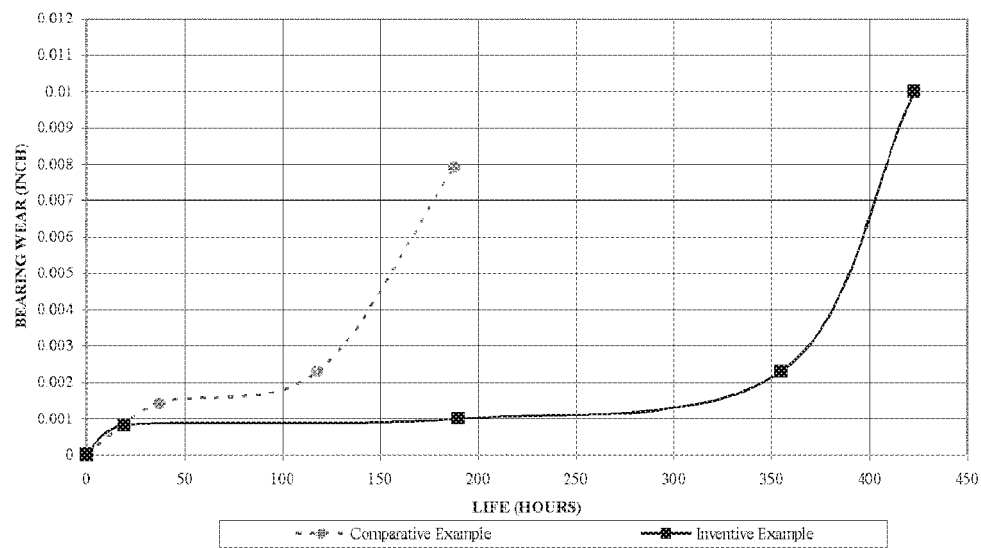
FIG. 6 is a wear versus use cycles graph for a spherical plain bearing Comparative Example versus a spherical plain bearing Inventive Example 1 containing a vacuum impregnated fluoropolymer lubricant with viscosity less than 5100 centistokes.

FIG. 6 is a bearing wear versus life graph illustrating a prior art self-lubricated bearing and a bearing of the invention which is identical to the prior art bearing except that a fluoropolymer lubricant with viscosity less than 5100 centistokes was vacuum impregnated into the self-lubricating liner. These bearings were tested according to Mil-B-81819/1-2 (Reversing Load Test with Alkaline Water Contaminant) which is used to evaluate helicopter bearings. The Comparative Example self-lubricated bearing of the invention is commercially available and the Inventive Example 1 bearing is the same bearing as the Comparative example bearing except that a fluoropolymer lubricant with viscosity below 5100 centistokes was vacuum impregnated into it. Inventive Example 1 bearings had less than half the wear after 1600 hours of testing under MILB-81819/1 Test Condition 4. This is a surprising result because the Comparative Example Bearings already contain a fluoropolymer lubricant; however the fluoropolymer lubricant incorporated into Comparative Example 1 bearing has viscosity greater than 5100 centistokes. In one embodiment this invention can be used to greatly extend the maintenance intervals for helicopters, thereby reducing operating costs, since it provides superior bearing life.

Figure 7:
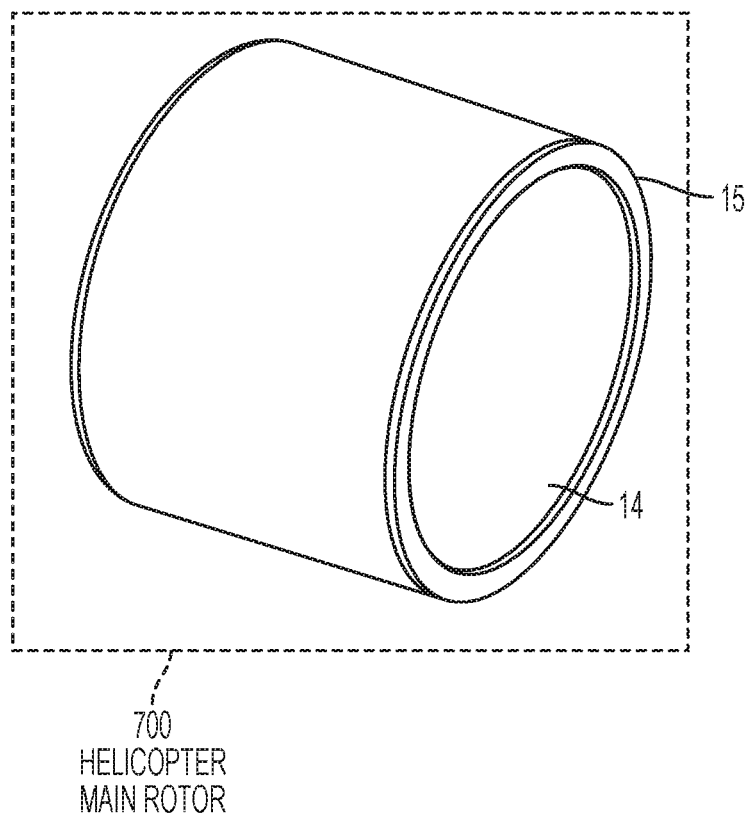
FIG. 7 further illustrates the bushing with self-lubricating line of FIG. 3 wherein the bearing is a helicopter main rotor bearing.

FIG. 7 illustrates a bearing or one sliding member 15 having the thin liner 14 attached to the inner surface of the sliding member 15, where the bearing is helicopter main rotor 700 bearing.

Figure 8:
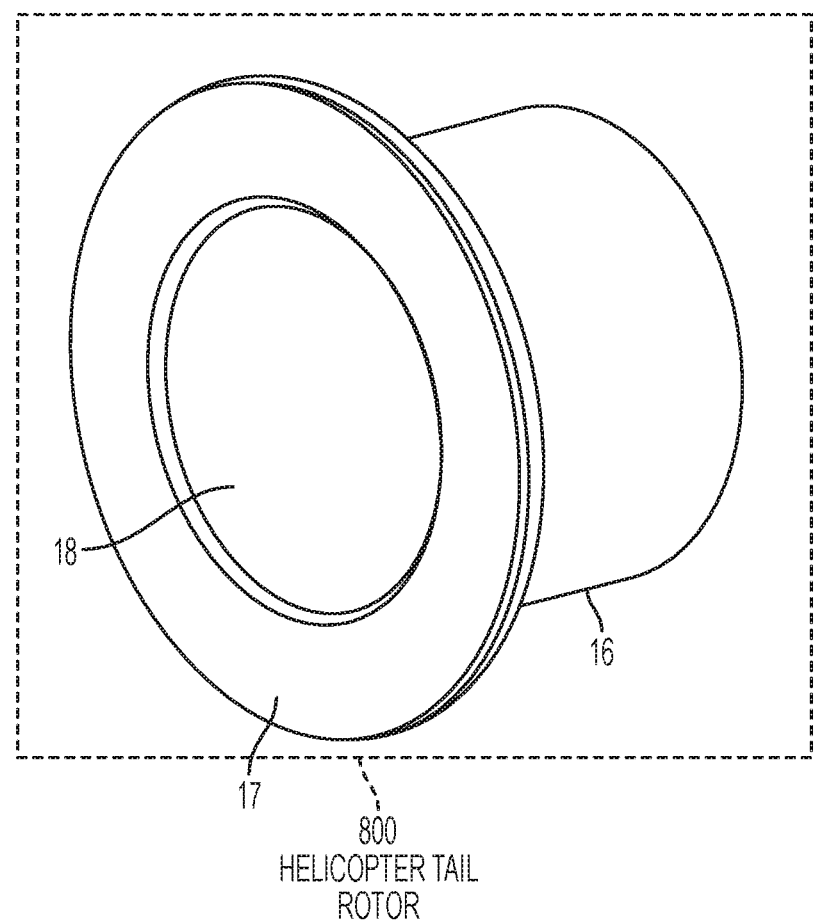
FIG. 8 illustrates a flanged bushing with lubricating liners on two surfaces. This bushing is a component with two bearing component surfaces—the outside flange and the internal circular bushing surface wherein the bearing is a helicopter tail rotor bearing.

FIG. 8 illustrates a flanged bearing 16 with lubricating liners 17, 18 on two surfaces, where the bearing is helicopter tail rotor 800 bearing.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Self-Lubricated Bearing Description

The principal self-lubricated bearing components of the invention are illustrated in FIG. 1. The first and second members may be constructed of any materials, and may be the same or different. As an example, the first and second members may be metal, polymer or ceramic based compositions or a combination of one or more of these compositions. In cases where the first or second members are some combination of metal and polymer, metal and ceramic, polymer and ceramic, or metal, polymer, and ceramic, the combination can be in the form of a composite structure where one or more components are intimately mixed with the other component or they may be in a layered structure where one or more components are layered on top of the other component (one non-limiting example being a ceramic coating over a metal substrate).

Often the first member is made of different materials than the second member in order to optimize bearing performance and reduce wear of the member as it slides along the lubricated liner. The first and second members often have specific surface finishes that may be the same or different. The first member may have a rougher surface finish to enhance adhesion of the lubricating liner in cases where the lubricating liner is adhered to the first member. In other articles of the invention the first and or second members may have a highly polished surface to reduce abrasive wear between the member and the lubricating liner.

The lubricating liner contains at least one structural polymer and at least one lubricant with viscosity less than 5100 centistokes. The structural polymer useful in the invention may be any thermoplastic or thermoset polymer. The structural polymer may be a homopolymer or copolymer. The structural polymer can be a mixture or alloy of two or more polymers.

A list of applicable structural polymer types (homo- or co-polymers) and thermoset polymers includes, but is not limited to: phenolic; epoxy; acrylate; polyester; polyamide; polyaramide; liquid crystal polymers; polyimides; polyamideimide; polyetherketone; polyether ether ketone (PEEK); polyphenylene oxide; polycarbonate; polyphenylene sulfide; polyethylene; polypropylene; polyoxyrnethylene; polybenzirnidazole; and polyphenylene, among others.

The structural polymers may contain any organic or inorganic additives, reinforcements, fibers, woven fabrics, non-woven fabrics, or stabilizers, to provide strength, toughness, stiffness, heat resistance, thermal conductivity, dimensional stability, hardness, wear resistance, thixotropy, color, or other attributes. The structural polymers provide the matrix for the lubricating liner composition.

The lubricating liner compositions useful in the invention may also contain reinforcing fibers. Glass fibers, polyaramide fibers, and carbon fibers are some of the more common reinforcing fibers found in self-lubricated bearing liners. One or more solid lubricant particles, organic fibers, or inorganic fibers especially comprised of polytetrafluoroethylene or other lubricants such as graphite, molybdenum disulfide, and hexagonal boron nitride are often included in the lubricating liner compositions useful in the invention.

The lubricating liner useful in the present invention may be solid or may have porosity. The porosity may have a closed cell (isolated pores) or open cell (connected pores) structure. Cured phenolic resins often naturally have some porosity within their cured structure. The lubricating liner may have porosity engineered into the composition through the use of foaming agents.

The lubricating liner can also have porosity engineered into its structure through the use of extractible salts. One non-limiting example would be using sodium benzoate as an additive to a polymer liner composition. The sodium benzoate may be subsequently extracted with hot water after the liner is formed, thereby leaving an engineered reservoir. This engineered reservoir is then vacuum impregnated or otherwise filled with at least one lubricant with viscosity below 5100 est.

The structural polymer holds the liner composition together and gives it integrity. The structural polymer may also contain a woven or non-woven fabric of any composition to provide increased strength or lubricity (in the case where the fabric comprises polytetrafluoroethylene, polyethylene fibers, or other lubricating fibers).

The lubricating liner may also contain solid lubricant polytetrafluoroethylene film in a composite type of structure.

The self-lubricated bearings can be made by separately making the lubricating liner, adhering it to one of the sliding members, and then constructing the bearing. The lubricating liner can also be made directly between the sliding members by a molding process where the liner composition is injected between the members and hardened in place. The lubricating liner can also be coated onto one of the sliding members and then combined with the other sliding member. The lubricating liner can also be placed between the sliding members and not adhered to one or the other sliding member so long as provision is made to mechanically or otherwise prevent the lubricating liner from slipping or moving out from in between the sliding members.

The at least one lubricant with viscosity less than about 5100 centistokes (est) can be any lubricant such as silicone fluids, hydrocarbon fluids, synthetic fluids, low molecular weight fluoropolymers or mixtures of more than one of these. The at least one lubricant viscosity is measured at or below 100° C. where it is less than about 5100 centistokes. The at least one lubricant can also contain dispersed additives to further enhance performance such as antioxidants, stabilizers, anti-corrosion additives, or fine lubricant particles like polytetrafluoroethylene, ceramic, graphite, molybdenum disulfide or hexagonal boron nitride. The at least one lubricant is preferably a perfluoropolyether, which represents a class of perfluoropolymers that differ mostly in viscosity (molecular weight) and chemical functionality. Some examples of commercially available perfluoropolyethers useful in the present invention include, but are not limited to, Krytox® GPL 100 series and XP series containing anticorrosion additives available from the DuPont Company. The at least one lubricant can also be chemically functionalized to enhance compatibility with the structural polymer, if so desired. An example of a chemically functionalized perfluoropolyether would be Fluorogard FMS from the DuPont Company. Pertluoropolyethers are also available from other manufacturers such as Solvay Solexis.

The at least one lubricant with viscosity below about 5100 est can be added to the self-lubricating liner at any stage of manufacture of the bearing of the invention. The at least one lubricant with viscosity below about 5100 est can be added to one or more of the liner components before the liner is formed, molded, or otherwise assembled. The at least one lubricant with viscosity below about 5100 est can be added to the liner after it is formed and can be added to the liner before or after the liner is assembled with the first bearing member and the second bearing member. In bearings of the invention where the liner is molded, sprayed, or otherwise coated in place, such as with acrylate liners or epoxy liners, for example, the at least one lubricant with viscosity below about 5100 est can optionally be combined with the acrylate liner precursors or epoxy liner precursors before molding, spraying, or otherwise coating the liner into place.

In a preferred method, the at least one lubricant with viscosity below about 5100 est is added to the liner after the liner is adhered to one of the bearing members. In the most preferred method the at least one lubricant with viscosity below about 5100 est is vacuum impregnated into the liner after the liner is adhered to one of the bearing members.

What is claimed is:

1. A method to make a self-lubricated bearing comprising:
   providing a first sliding ball member comprising a first material and including a first surface having a convex outer surface wherein said ball member has a bore to be placed on a shaft or rod;
   providing a second sliding member race component circumscribing the ball member and comprising a second material and a second surface, the second surface conforming with the convex outer surface;
   providing a sliding contact area located between the first surface and the second surface;
   providing a porous lubricating liner conforming with the first surface and the second surface wherein the lubricating liner comprises a third material different from the first material and the second material, the third material comprising at least one polymer selected from a phenolic, acrylate, polyimide or epoxy;
   adhering the liner to either the first sliding ball member or the second sliding member race component; and
   vacuum impregnating at least one lubricant with a viscosity less than 5100 centistokes into the lubricating liner after the lubricating liner is adhered to either the first sliding ball member or the second sliding member race component.

2. The method of claim 1, wherein the at least one lubricant with viscosity below 5100 centistokes is a fluorinated polymer.

3. The method of claim 1, wherein the at least one lubricant with a viscosity below 5100 is a perfluoropolyether.

4. The method of claim 1, wherein the at least one lubricant has a viscosity less than 2000 centistokes.

5. The method of claim 1, wherein the at least one lubricant has a viscosity less than 2000 centistokes and is a fluorinated polymer.

6. The method of claim 1 wherein the at least one lubricant has a viscosity of less than 2000 centistokes and is a perfluoropolyether.

7. The method of claim 1, wherein the lubricating liner comprises the at least one polymer and 0.1%-15% by weight of the at least one lubricant with a viscosity less than 5100 centistokes.

8. The method of claim 1, wherein the lubricating liner comprises the at least one polymer and 0.1%-15% by weight of the at least one lubricant with a viscosity less than 2000 centistokes.

9. The method of claim 1, wherein the lubricating liner additionally comprises a fibrous reinforcement.

10. The method of claim 1, wherein the first or second sliding member comprises a ceramic material.

11. The method of claim 1, wherein the first or second sliding member comprises a metal material.

12. The method of claim 1, wherein the first or second sliding member comprises a ceramic coating over a metal substrate.

13. The method of claim 1, wherein the third material comprises a phenolic and said lubricant comprises a perfluropolyether.

14. The method of claim 1, wherein the third material comprises an acrylate and said lubricant comprises a perfluropolyether.

15. The method of claim 1, wherein the third material comprises an epoxy and said lubricant comprises a perfluropolyether.

16. The method of claim 1, wherein the third material comprises a polyimide and said lubricant comprises a perfluropolyether.

17. The method of claim 1, wherein the third material comprises a phenolic and said lubricant comprises a fluorinated polymer.

18. The method of claim 1, wherein the third material comprises an acrylate and said lubricant comprises a fluorinated polymer.

19. The method of claim 1, wherein the third material comprises an epoxy and said lubricant comprises a fluorinated polymer.

20. The method of claim 1, wherein the third material comprises a polyimide and said lubricant comprises a fluorinated polymer.

21. The method of claim 1, wherein the lubricating liner includes a fibrous additive.

22. The method of claim 1, wherein the bearing is placed in a helicopter.

23. The method of claim 1, wherein the bearing is placed in a helicopter main rotor.

24. The method of claim 1, wherein the bearing is placed in a helicopter tail rotor.

* * * * *